No. 892,824. PATENTED JULY 7, 1908.
J. W. & B. D. GLASCOCK.
VEHICLE.
APPLICATION FILED FEB. 16, 1907.
2 SHEETS—SHEET 2.
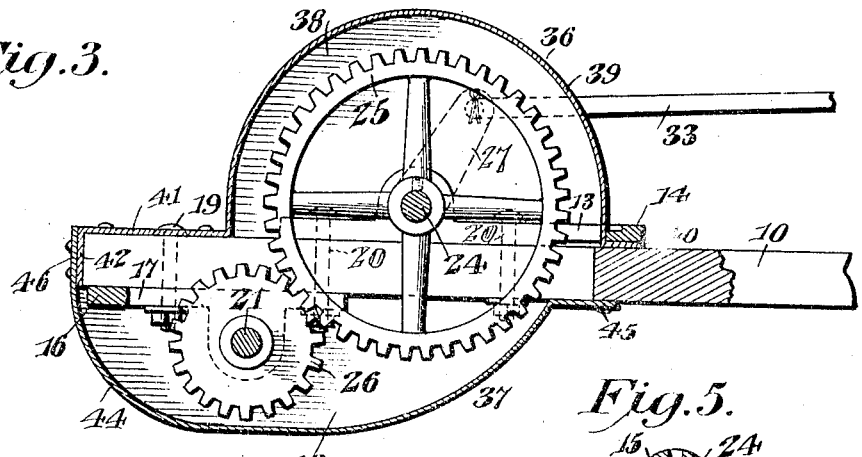
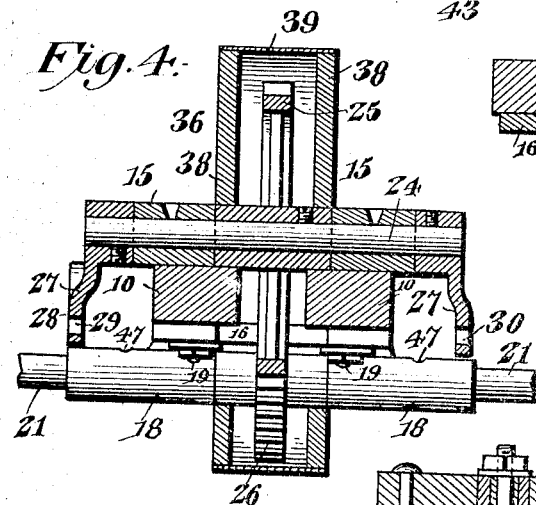
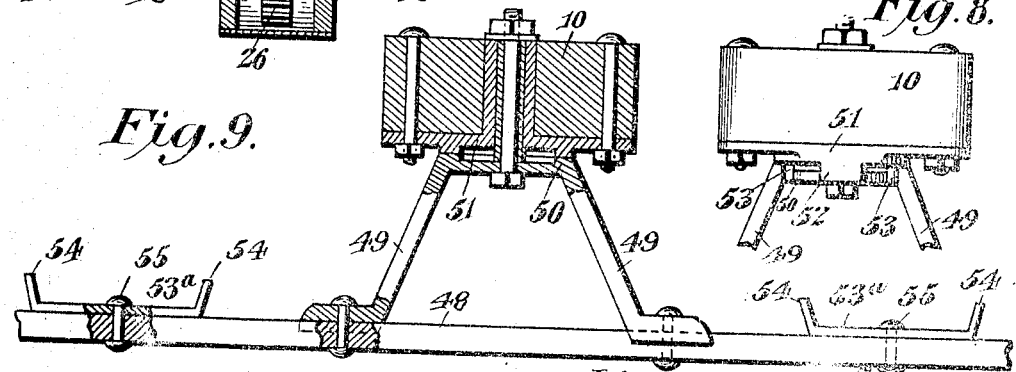
Witnesses
John W. Glascock, Inventors
Benjamin D. Glascock,
By
Attorney

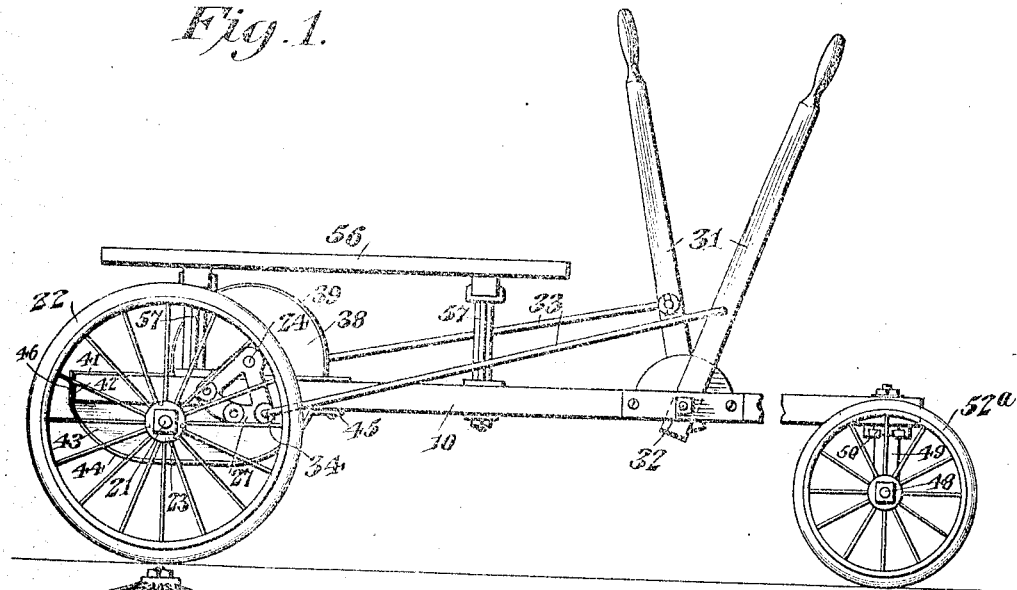

UNITED STATES PATENT OFFICE.

JOHN W. GLASCOCK AND BENJAMIN D. GLASCOCK, OF MUNCIE, INDIANA.

VEHICLE.

No. 892,824.   Specification of Letters Patent.   Patented July 7, 1908.

Application filed February 16, 1907. Serial No. 357,708.

*To all whom it may concern:*

Be it known that we, JOHN W. GLASCOCK and BENJAMIN D. GLASCOCK, citizens of the United States, residing at Muncie, in the county of Delaware and State of Indiana, have invented a new and useful Vehicle, of which the following is a specification.

This invention relates more particularly to that type of manually propelled vehicles disclosed in a patent granted to Samuel Dyer, No. 859,171, dated July 2, 1907.

The principal object is to provide certain improvements, whereby the elements can be cheaply produced, can be readily assembled and effectively fastened in place, and are so associated that if one becomes broken or greatly worn, it can be easily removed and replaced by a new part.

A further and important object is to provide novel and simple means for inclosing the gearing to protect the same from dust and dirt, said means being readily removable if access to the gear is necessary or desirable.

The preferred embodiment of the invention is illustrated in the accompanying drawings, wherein Figure 1 is a side elevation of the vehicle. Fig. 2 is a plan view thereof with the seat removed. Fig. 3 is a vertical sectional view on an enlarged scale through the gearing, and casing. Fig. 4 is a cross sectional view through the same. Fig. 5 is a detail sectional view on the line 5—5 of Fig. 2. Fig. 6 is a detail perspective view of the upper bracket. Fig. 7 is a detail perspective view of the lower bracket. Fig. 8 is a front elevation of the fifth wheel for the front axle. Fig. 9 is a sectional view therethrough.

Similar reference numerals designate corresponding parts in all the figures of the drawings.

In the embodiment of the invention disclosed, a supporting member in the form of a single bar 10 is employed, the rear end of which is bifurcated, as shown at 11 to produce spaced sections 12. A substantially U-shaped bracket is mounted on the upper side of the supporting member or bar 10, and comprises side arms 13 that are located upon the sections 12, and are connected at their front ends by a cross bar 14. The side arms carry spaced journal boxes 15. Another U-shaped bracket is secured to the under side of the bar or member, and comprises a cross bar 16 that bridges the space between the rear ends of the sections 12, and has connected to its ends, side bars 17 that are located longitudinally of and against the under sides of the sections 12. The side arms are provided with spaced alined journal boxes 18. The brackets are secured to the sections 12 by bolts 19 and 20, the bolts 20 passing through the rear ends of the upper arms 13 and through the front ends of the lower arms 17. Journaled in the lower set of boxes 18 is an axle shaft 21, on the ends of which are mounted wheels 22, one of which is fixed to the axle by suitable clips 23. A driving shaft 24 is journaled in the upper set of boxes 15, and a gear wheel 25, carried by the shaft 24, meshes with a pinion 26 fixed to the axle or shaft 21. The gears are located between the journal boxes, and in the bifurcation 11 of the supporting bar.

The ends of the shaft 24, outside the boxes 15, are provided with crank arms 27, one of which has at its free end a quadrant 28 having a plurality of sockets 29, the other arm having a single socket 30. Operating levers 31, fulcrumed at their lower ends, as shown at 32 upon opposite sides of the front portion of the supporting bar 10, have pitman connections 33 with the crank arm 27, one of said pitmen having an offset terminal 34 that is adapted to be placed in any of the sockets 29, the other having a corresponding offset 35 that is engaged in the socket 30 of the other crank arm. No claim is made to this portion of the mechanism, for the same is fully set forth and covered by claims of the co-pending application, to which reference has already been made.

In order to house the gearing from dust and dirt, as well as protect the rider, a casing is employed comprising upper and lower sections 36 and 37, the upper section consisting of substantially semi-circular side walls 38, located on opposite sides of the upper portion of the gear wheel 25, and inside the boxes 15. A curved wall 39 is secured to the peripheral portion of the side walls 38, and has an offset terminal or ear 40 engaged beneath the cross bar 14 of the upper bracket. The rear portion of the wall 39 bridges the rear end of the bifurcation 11 of the supporting bar, as shown at 41, and has a downturned terminal 42 located over the end of the said bar. The lower section 37 comprises spaced side walls 43 disposed on opposite sides of the gearing, but inside the lower boxes 18, and the curved wall 44 secured to the lower edges of the side walls, has an offset ear 45 at its front end fastened to the under side of the bar, while the rear end of said wall overlaps the end 42 of the upper wall, as shown at 46. It will thus be seen that while the gearing is entirely inclosed, the boxes are exposed, and it will be observed by reference to Fig. 2 that the lower boxes extend beyond the sides of the bar 10. These boxes are provided with suitable oil holes 47.

Pivotally mounted upon the front end of the bar 10 is a steering axle 48 that is secured to the lower end of a bracket 49, said bracket having a circular bearing 50 against the under side of a fitting 51 fastened to the front end of the supporting bar. A depending lug 52, carried by said fitting, is adapted to be abutted against by shoulders 53 on the bracket 49 and thus limit the swinging movement of the axle. On the outer ends of the axle 48 are journaled suitable wheels 52ª and between these wheels and the bracket 49 are foot-receiving stirrups 53ª comprising plates having upturned terminals 54 and being pivoted as shown at 55 to the axle. A suitable seat, as 56 is supported on the standards 57, that rest upon the supporting bar, said seat being disposed over the gearing and terminating short of the levers 31.

With this construction, it will be evident that upon the operation of the levers, power will be transmitted through the gearing to the rear axle or shaft 21, and that the revolution of this axle or shaft will effect the rotation of the driving wheel, thus propelling the vehicle. In this structure, the upper and lower sets of boxes for the shaft are entirely separate and either set may be removed without the necessity of detaching the other. Moreover, the gearing is housed so that it is protected from dust and dirt, and the danger of the operator becoming injured or caught thereby, is obviated. This is an important feature when it is considered that the mechanism is used entirely by children.

From the foregoing, it is thought that the construction, operation, and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described our invention, what we claim as new, and desire to secure by Letters Patent, is:—

1. In a vehicle of the character described, the combination with a supporting member having spaced sections at its rear end, of a front axle connected to the front portion of the member, a substantially U-shaped bracket having a cross bar disposed transversely of the member and provided with rearwardly extending arms located longitudinally of and secured to the spaced sections, journal boxes integral with the arms and projecting above the sections, a driving shaft journaled in the boxes, cranks mounted on the ends of the driving shaft outside the boxes and sections, operating means having separate pitman connections with the cranks, spaced journal boxes projecting below the sections of the supporting member, a rear axle shaft journaled in the lower boxes, gearing connecting the driving shaft and axle between the upper and lower journal boxes, and wheels carried by the axle shaft.

2. In a vehicle of the character described, the combination with a supporting member having spaced sections at its rear end, of a substantially U-shaped bracket having forwardly extending arms located against the under sides of the sections and provided with spaced boxes, another oppositely disposed and separate substantially U-shaped bracket having rearwardly extending arms located upon the upper sides of the sections, said arms being also provided with spaced boxes, the rear ends of the upper arms being located above the front ends of the lower arms, common fasteners passing through said ends and the sections of the supporting member, an axle shaft journaled in the lower set of boxes, a driving shaft journaled in the upper set of boxes, and gearing connecting the shafts and located between the sections.

3. In a vehicle, the combination with a supporting bar having a bifurcated rear end, of a substantially U-shaped bracket located against the under side of the bar and having side bars disposed longitudinally against the under sides of the sections on opposite sides of the bifurcations, said arms being provided with boxes, another and separate substantially U-shaped bracket mounted on the upper side of the bar and having side arms located against the upper sides of the sections on opposite sides of the bifurcation, said side arms being also provided with boxes, fastening bolts securing the brackets to the bar, certain of said bolts passing through the rear ends of the upper arms and the front ends of the lower arms, shafts journaled in the boxes, wheels mounted on one of the shafts, driving means connected to the other shaft, and gearing connecting the shafts and located in the bifurcation of the bar.

4. In a vehicle of the character described, the combination with a supporting member having spaced sections, of axle and driving shafts journaled respectively below and above the sections, gearing connecting the shafts and located between the sections, and a casing comprising an upper and a lower section, the upper section bridging the space between the supporting member sections and bearing upon the same, the lower casing section bearing against the under side of the supporting member sections and also bridging the space between the same, said casing inclosing the gearing.

5. In a vehicle, the combination with a supporting member having a bifurcated portion, forming spaced sections, of brackets mounted on the upper and under sides of the member and having sets of spaced boxes located against the opposite sides of the sectons, axle and driving shafts journaled in the boxes, gearing connecting the shafts and located in the bifurcation, a casing section secured to the member and covering the bifurcation and gearing, leaving the upper boxes exposed, and another casing section secured to the under side of the member and inclosing the under portions of the gearing and bifurcation, said latter casing section leaving the lower boxes exposed.

In testimony, that we claim the foregoing as our own, we have hereto affixed our signatures in the presence of two witnesses.

JOHN W. GLASCOCK.
BENJAMIN D. GLASCOCK.

Witnesses:
H. H. WOLF,
L. L. BRACKEN.